Patented Feb. 9, 1954

2,668,850

UNITED STATES PATENT OFFICE 2,668,850

PHENYL-PHENETHYL KETONES

Moses Wolf Goldberg, Upper Montclair, and Albert Israel Rachlin, Hackensack, N. J., assignors to Hoffmann-La Roche Inc., Nutley, N. J., a corporation of New Jersey No Drawing. Application April 24, 1952,
Serial No. 284,211

6 Claims. (Cl. 260—501)

Our invention relates to p-(β-diethylaminoethoxy)phenyl-phenethyl ketone (Formula I) and the acid addition salts thereof, useful as fungicide agents.

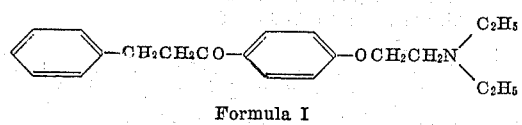

Formula I

Our novel compounds, as mentioned above, may take the form of the material shown in Formula I or acid addition salts thereof, such as the citrate, oxalate, hydrochloride, and hydrobromide. Other acid addition salts may also be prepared and are contemplated within the scope of our invention.

In general, our new compounds may be prepared by hydrogenation of the corresponding unsaturated compounds. Thus, p-(β-diethylaminoethoxy)phenyl styryl ketone oxalate (Formula II) may be hydrogenated to p-(β-diethylaminoethoxy)phenyl-phenethyl ketone oxalate (Formula III).

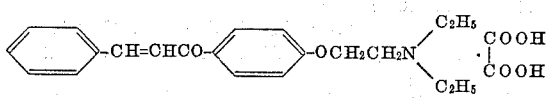

Formula II

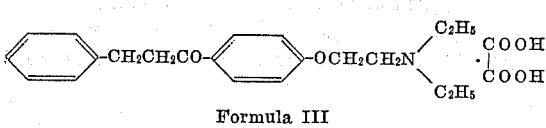

Formula III

Other acid addition salts may similarly be prepared by reducing the corresponding unsaturated ketone salts. Moreover, the free base form (Formula I) may be prepared by hydrogenation of the corresponding unsaturated ketone or by neutralization of one of the acid addition salts, as, for example, by neutralization of the oxalate (Formula III) by means of sodium hydroxide. The free base may be converted to a desired acid addition salt by treatment with a suitable acid. For example, the saturated ketone (Formula I) may be reacted with citric acid to obtain the corresponding citrate.

The experimental material which follows illustrates the production of our novel compounds, both in the form of the free base and in the form of several typical acid addition salts. Since p-(β-diethylaminoethoxy)phenyl styryl ketone is, itself, new, both as a free base and in the form of acid addition salts, the experimental portion of this application also presents data disclosing the production of the styryl compounds.

EXPERIMENTAL p-Hydroxyphenyl styryl ketone

To a stirred solution of 100 grams of sodium hydroxide in 1 liter of water (30° C.) was added 136 grams of p-hydroxyacetophenone and 500 cc. of ethanol. Benzaldehyde (105 cc., 110 grams) was added and the solution was stirred at room temperature for 24 hours. The solution was poured into 3 liters of water and, with stirring, the mixture was acidified to Congo red with concentrated hydrochloric acid. The product was filtered, washed with 2 liters of water and then it was air dried. Recrystallized from 1,300 cc. of ethanol, the product (p-hydroxyphenyl styryl ketone) melted at 171–172° C.

p-(β-Diethylaminoethoxy)phenyl styryl ketone oxalate

Sodium methoxide (37 grams) was added to a solution of 147 grams of p-hydroxyphenyl styryl ketone in 2 liters of chlorobenzene contained in a 5 liter stirred flask equipped with a downward condenser. Chlorobenzene was distilled off at atmospheric pressure until 800 cc. of distillate had been collected. The slurry of the sodium salt was stirred while it was allowed to cool to room temperature.

Meanwhile, free β-diethylaminoethyl chloride was liberated from the hydrochloride as follows: 225 grams of crude β-diethylaminoethyl chloride hydrochloride were suspended in 400 cc. of ice-cold chlorobenzene. 200 cc. of 50% sodium hydroxide solution were added in portions with stirring, the entire mixture being kept cold in an ice bath. The top layer was decanted through a sintered glass funnel. The bottom aqueous layer was extracted three times with 200 cc. portions of chlorobenzene. All the chlorobenzene extracts were combined and dried over magnesium sulfate in a refrigerator.

The chlorobenzene solution of the β-diethylaminoethyl chloride was filtered from the magnesium sulfate, the filtrate was added to the slurry of the sodium salt of p-hydroxyphenyl styryl ketone, and the mixture was stirred and refluxed for 4 hours. The chlorobenzene was removed by steam distillation and the residue was allowed to cool to room temperature. The oily base was extracted into two 400 cc. portions of ether, the combined ether extracts were dried over magnesium sulfate, and the solvent was removed in vacuo. The base, p-(β-diethylaminoethoxy) phenyl styryl ketone, was dissolved in 400 cc. of ethanol, a solution of 83 grams of oxalic acid dihydrate in 250 cc. of warm ethanol was added, and the resulting solution was allowed to cool to 30° C. Ether (600 cc.) was added, the slightly turbid solution was seeded, and the mixture was allowed to stand in a cool place to crystallize. The product was p-(β-diethylaminoethoxy)phenyl styryl ketone oxalate of M. P. 152–153° C. A sample, recrystallized three times from 97% ethanol, melted at 151–152° C.

*p-(β-Diethylaminoethoxy)phenyl styryl ketone hydrobromide*

4 grams of the oxalate, prepared as above, were partitioned between 120 cc. of ether, 150 cc. of water and 10 cc. of 50% sodium hydroxide solution. The ether layer was dried over magnesium sulfate and, after removal of the solvent, the residue was dissolved in 3 cc. of ethanol and this solution was treated with 3 cc. of 20% alcoholic hydrogen bromide. On cooling, the solution set to a mass of white crystals. The product, recrystallized from 75 cc. of ethanol, melted at 170–172° C.

*p - (β - Diethylaminoethoxy) phenyl - phenethyl ketone oxalate*

Palladium oxide (8 grams), suspended in 100 cc. of ethanol, was pre-reduced in a Parr hydrogenation apparatus. Most of the alcohol was decanted from the catalyst and a solution of 41.3 grams of p - (β - diethylaminoethoxy) - phenyl styryl ketone oxalate in 150 cc. of ethanol and 75 cc. of water was added to the catalyst. The mixture was shaken with hydrogen at an initial pressure of 38.5 p. s. i. Absorption of the gas ceased when 0.1 mole had been taken up. The catalyst was then filtered off and the solvent removed in vacuo. The residual oil was stored in a vacuum desiccator over phosphorus pentoxide for 2 days. The oil was then dissolved in 300 cc. of warm acetonitrile, the solution was filtered, and the mother liquor, on cooling and seeding, deposited a mass of white crystals. M. P. 64–66° C. Recrystallized from 225 cc. of acetonitrile, the product, p-(β-diethylaminoethoxy)phenyl-phenethyl ketone oxalate, was pure white. M. P. 64–66° C.

*p - (β - Diethylaminoethoxy)phenyl - phenethyl ketone hydrobromide*

In a manner similar to the production of the oxalate, the hydrobromide may be prepared by hydrogenation of the corresponding styryl ketone hydrobromide, whose production is shown above.

*p - (β - Diethylaminoethoxy)phenyl - phenethyl ketone*

A solution of 11.5 grams of p-(β-diethylaminoethoxy)phenyl-phenethyl ketone oxalate in 250 cc. of water was treated with 30 cc. of 4 N sodium hydroxide solution. The precipitated base was extracted with two 200 cc. portions of ether. After drying the combined ether extracts with magnesium sulfate, the solvent was removed in vacuo. The residual oily p-(β-diethylaminoethoxy)phenyl-phenethyl ketone weighed 8.3 grams.

*p - (β - Diethylaminoethoxy) phenyl - phenethyl ketone citrate*

The 8.3 gram quantity of ketone made in the preceding paragraph was dissolved in 45 cc. of ethanol and a warm solution of 5.25 grams of citric acid in 20 cc. of ethanol was added. The solution was allowed to stand in a cool place to crystallize. The crystalline citrate thus obtained weighed 12.3 grams and melted at 116–117° C. The analytical sample, recrystallized twice from ethanol, melted at 117–118° C.

We claim:

1. A compound selected from the group consisting of p - (β - diethylaminoethoxy)phenyl-phenethyl ketone having the formula

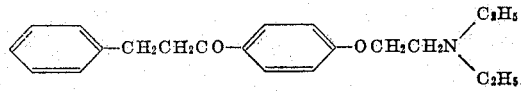

and the acid addition salts thereof.

2. p-(β-Diethylaminoethoxy)phenyl-phenethyl ketone.

3. p-(β-Diethylaminoethoxy)phenyl-phenethyl ketone oxalate.

4. p-(β-Diethylaminoethoxy)phenyl-phenethyl ketone citrate.

5. p-(β-Diethylaminoethoxy)phenyl-phenethyl ketone hydrobromide.

6. p-(β-Diethylaminoethoxy)phenyl-phenethyl ketone hydrochloride.

MOSES WOLF GOLDBERG.
ALBERT ISRAEL RACHLIN.

References Cited in the file of this patent
UNITED STATES PATENTS

| Number | Name | Date |
|---|---|---|
| 1,894,865 | Hartmann et al. | Jan. 17, 1933 |